United States Patent
Bombeck

(10) Patent No.: US 11,337,544 B1
(45) Date of Patent: May 24, 2022

(54) SINGLE BREW SYSTEM

(71) Applicant: Saint Anthony Industries LTD, Salt Lake City, UT (US)

(72) Inventor: Khristian Bombeck, Salt Lake City, UT (US)

(73) Assignee: Saint Anthony Industries LTD, Salt Lake City, UT (US)

( * ) Notice: Subject to any disclaimer, the term of this patent is extended or adjusted under 35 U.S.C. 154(b) by 482 days.

(21) Appl. No.: 16/388,911

(22) Filed: Apr. 19, 2019

Related U.S. Application Data

(60) Provisional application No. 62/659,721, filed on Apr. 19, 2018.

(51) Int. Cl.
| | |
|---|---|
| *A47J 31/00* | (2006.01) |
| *A47G 19/14* | (2006.01) |
| *A47J 31/44* | (2006.01) |
| *A47J 31/54* | (2006.01) |
| *A47J 27/21* | (2006.01) |

(52) U.S. Cl.
CPC ........... *A47J 31/4425* (2013.01); *A47J 31/54* (2013.01); *A47J 27/21* (2013.01)

(58) Field of Classification Search
CPC ........... A47J 31/00; A47J 31/18; A47G 19/14; A47G 19/16
See application file for complete search history.

(56) References Cited

U.S. PATENT DOCUMENTS

| | | | | |
|---|---|---|---|---|
| 3,244,327 | A * | 4/1966 | Dunning | A47G 19/34 222/643 |
| 4,196,658 | A * | 4/1980 | Takagi | A47J 31/42 99/286 |
| 2002/0104442 | A1* | 8/2002 | Maxwell | A47J 31/0605 99/287 |
| 2008/0245436 | A1* | 10/2008 | Lang | B67D 3/0032 141/2 |
| 2012/0091119 | A1* | 4/2012 | Lim | A47J 27/21166 219/431 |
| 2013/0059049 | A1* | 3/2013 | Zhang | A47J 31/4425 426/435 |
| 2014/0338541 | A1* | 11/2014 | Jaccard | A47J 31/468 99/283 |
| 2018/0289199 | A1* | 10/2018 | Atilla | A47J 31/18 |

OTHER PUBLICATIONS

English translation of CN 204444006 (Year: 2015).*
English translation of CN 205994286 (Year: 2017).*
English translation of CN 213309090 (Year: 2020).*

* cited by examiner

*Primary Examiner* — Michael A Laflame, Jr.
(74) *Attorney, Agent, or Firm* — Joseph E. Maenner; Maenner & Associates, LLC

(57) ABSTRACT

A single brew system includes a kettle base and a platform is attached to the kettle base. The platform is adapted to receive and retain a kettle. A mug base is spaced from the kettle base and a mug platform is attached to the mug base. The mug platform is adapted to receive a mug.

10 Claims, 5 Drawing Sheets

SINGLE BREW SYSTEM

CROSS-REFERENCE TO RELATED APPLICATION

The present application claims priority from U.S. Provisional Patent Application Ser. No. 62/659,721, filed on Apr. 19, 2018, which is incorporated herein by reference in its entirety.

BACKGROUND OF THE INVENTION

Field of the Invention

The invention is related to single brew systems, typically for brewing coffee or tea.

Prior Art

Single serve brewing systems typically use pre-packaged coffee grounds or tea leaves that are inserted into the brewing system. Hot water is poured into the packaging and allowed to gravity drain into a mug or cup.

It would be beneficial to provide a single brew system that is reflective of "old-time" brewing, using a standard coffee pot with a handle and spout that is tilted to pour hot water from the spout into a mug or a cup.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, the present invention provides a single brew system including a kettle base and a platform is attached to the kettle base. The platform is adapted to receive and retain a kettle. A mug base is spaced from the kettle base and a mug platform is attached to the mug base. The mug platform is adapted to receive a mug.

The present invention also provides a brew system comprising a kettle base and a kettle motor located in the kettle base. The kettle motor has a kettle motor output. A kettle platform is pivotally connected to the kettle output such that, when the kettle motor operates, the kettle base pivots relative to the kettle base. Also, a motor base is attached to the kettle base and a mug motor is located in the mug base. The mug motor has a mug motor output. A mug platform is rotationally connected to the mug motor output such that, when the mug motor operates, the mug base rotates relative to the mug base.

The invention further provides a method of brewing a beverage comprising the steps of providing the brew system described above; placing a kettle onto the kettle platform; pouring a liquid into the kettle; placing a mug onto the mug platform; placing a brewing system onto the mug; and operating the kettle motor to pivot the kettle such that the liquid pours from the kettle, over the brew system, and into the mug.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
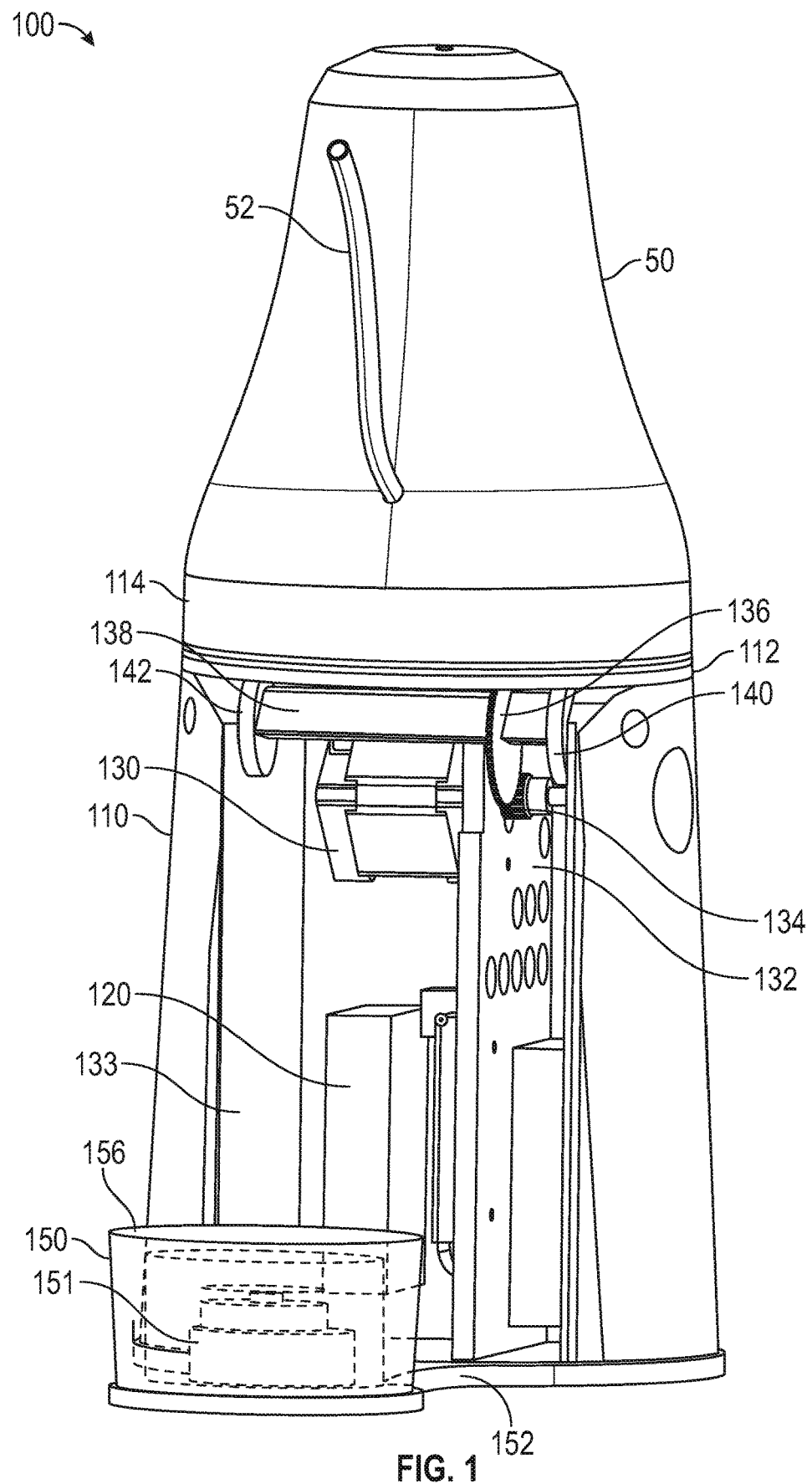
FIG. 1 is a front elevational view, partially in section, of a single brew system according to an exemplary embodiment of the present invention, with a kettle mounted thereon.
Figure 2:
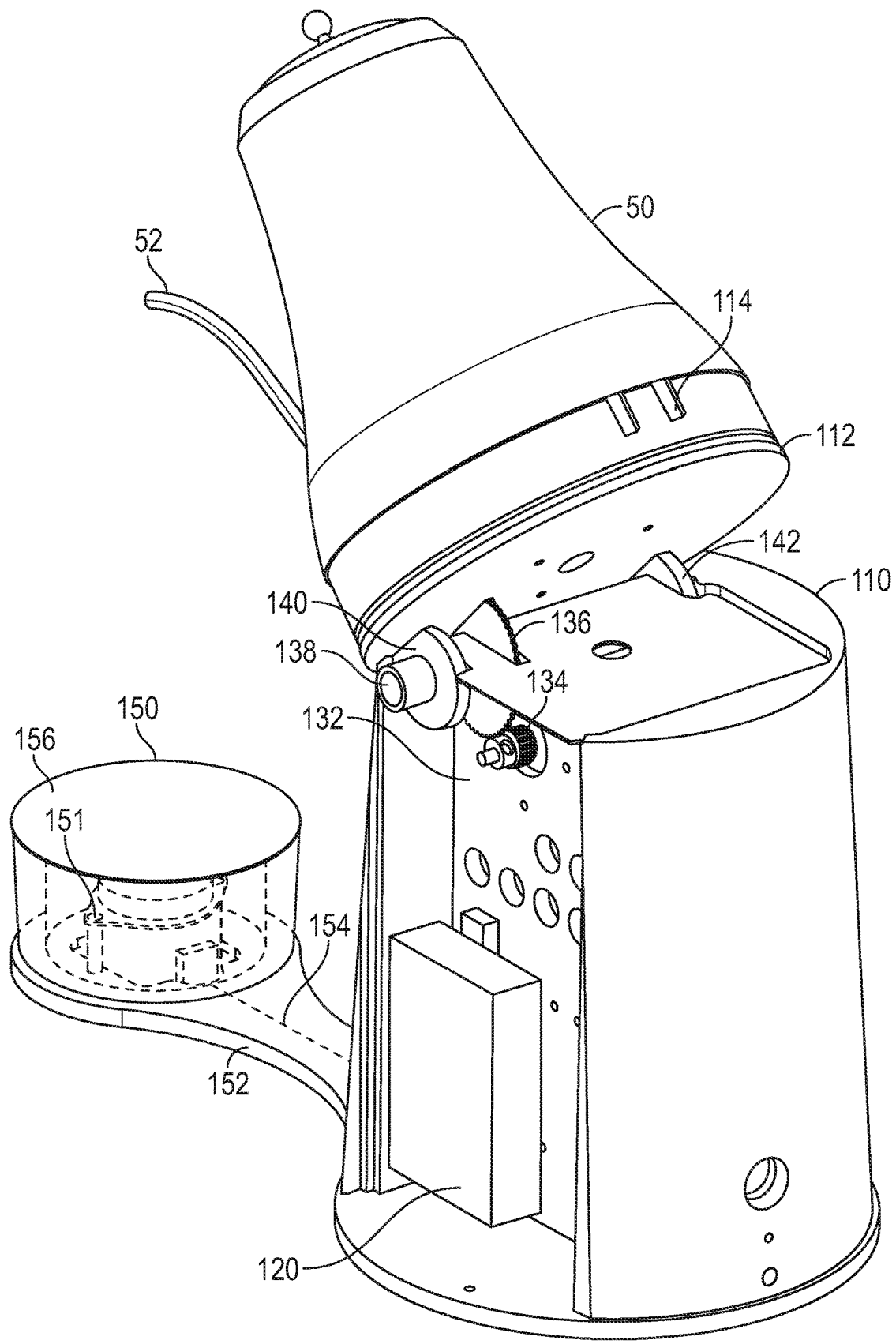
FIG. 2 is a left rear perspective view, partially in section, of the single brew system with kettle of FIG. 1, with the kettle tipped for pouring.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As shown in FIGS. 1-5, the present invention is a single brewing system 100 ("system 100"). System 100 can be used to brew a single serving of coffee, tea, or any other brewed beverage. In an exemplary embodiment, system 100 can be used in conjunction with the single serve brewing system disclosed in U.S. patent application Ser. No. 15/820, 497, invented by the inventor of the present invention, which is incorporated herein by reference in its entirety. The single serve brewing system can be mounted on top of a coffee mug or other fluid retaining vessel. Those skilled in the art, however, will recognize that other single serve brewing systems can be used.

System 100 includes a kettle base 110 on which a kettle 50 or other vessel is placed. Kettle base 100 tips kettle 50 so that hot water (or other liquid) pours from spout 52 of kettle 50 into the single serve brewing system mentioned above. System 100 also includes a mug base 150 on which a coffee mug (not shown) is placed. Mug base 150 is connected to kettle base via an arm 152 that spaces mug base 150 a pre-determined distance away from kettle base 110.

While mug base 150 is fixedly connected to kettle base 110, those skilled in the art will recognize that kettle base 110 and mug base 150 can be separate from each other. Alternatively, although not shown, mug base 150 can be adjustably attached to kettle base 110, such as by an adjustable arm 152 that can be pulled out of or pushed into kettle base 110 by a predetermined distance, which can be determined based on the configuration and geometry of the kettle 50 and its spout 52.

Figure 3:
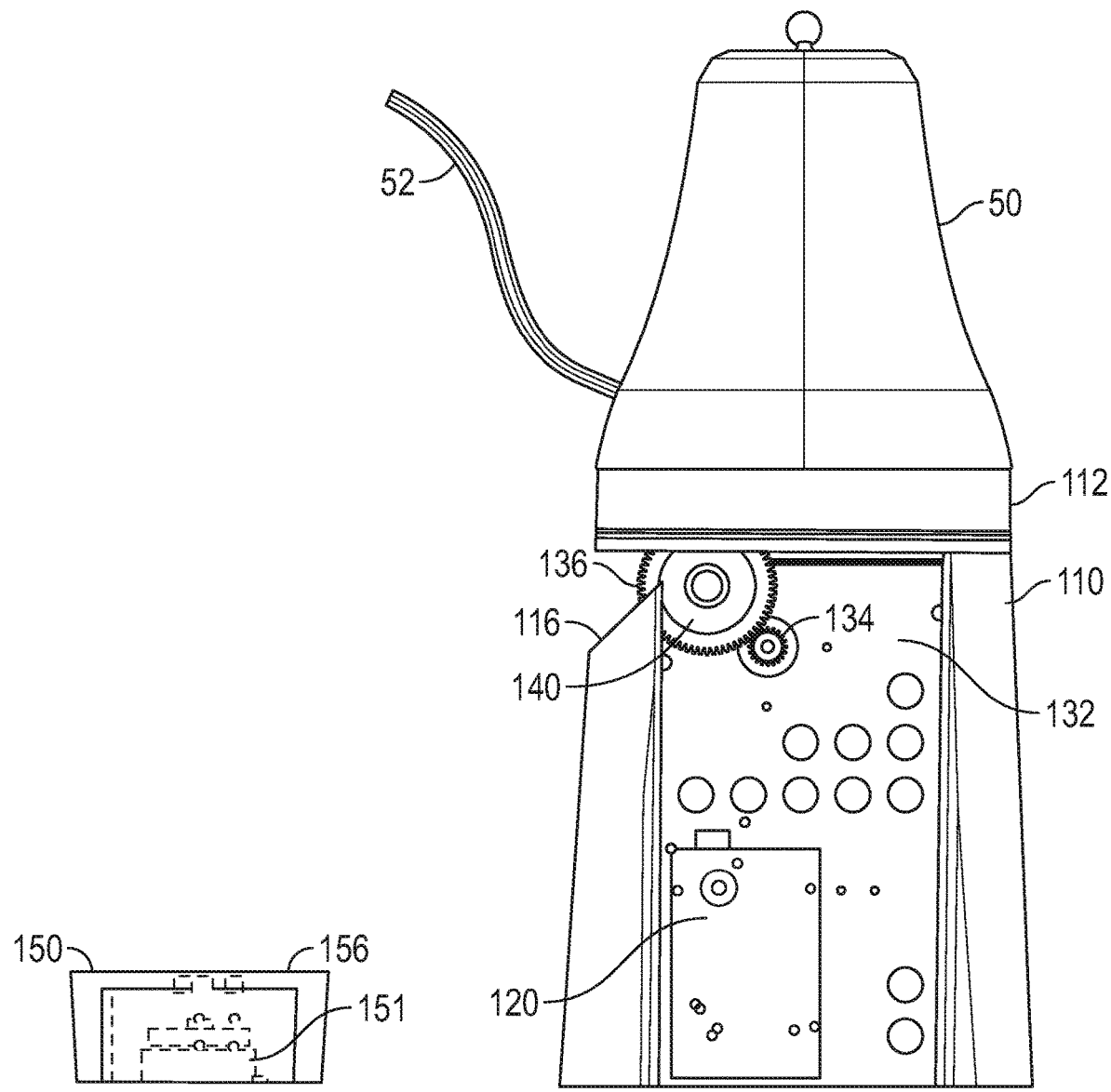
FIG. 3 is a side elevational view, partially in section, of the single brew system with kettle of FIG. 1.
Figure 4:
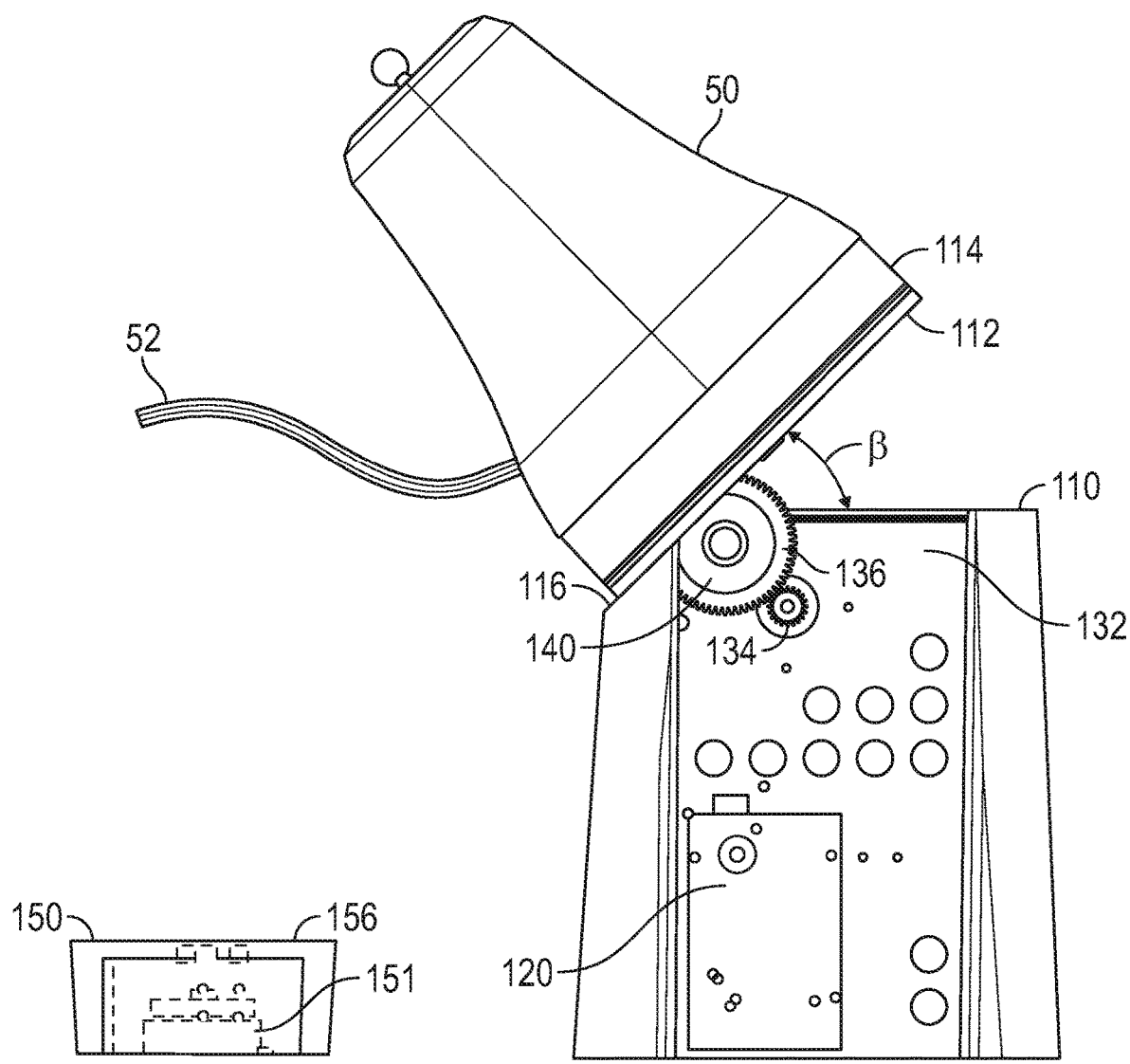
FIG. 4 is a side elevational view, partially in section, of the single brew system with kettle of FIG. 2.

Kettle base 110 includes a platform 112 on which kettle 50 is placed. Platform 112 can be pivoted from a horizontal position as shown in FIG. 3 to a tipped position at an angle β relative to the horizontal as shown in FIG. 4 so that liquid inside the kettle 50 pours out of spout 52 and into the single serve coffee brewing system that is mounted on the mug. In an exemplary embodiment, the maximum angle β is about 45 degrees, although those skilled in the art will recognize that angles other than 45 degrees can be used.

Platform 112 includes a cavity 114 in which the bottom portion of kettle 50 is placed so that kettle 50 does not slide off platform 112 when platform 112 is pivoted. Also, as shown in FIG. 4, a top face 116 of kettle base 110 is beveled so that, when platform 112 is pivoted to a pour position, Kettle base 110 also houses electronics and machinery to tilt platform 112. FIG. 1 shows an electronic controller 120 that is used to operate system 100. Additionally, a first electric motor 130 is used to pivot platform 112. First electric motor 130 is electrically connected to controller 120 via an electrical connection 122, shown in FIG. 5.

A first vertical support 132 supports motor 130, as well as controller 120. Motor 130 has a toothed motor output 134 that is engaged with a pivoting gear 136. Pivoting gear 136 is fixedly mounted on a rotating shaft 138 such that, when pivoting gear 136 rotates, shaft 138 rotates as well. Shaft 138 is supported by first vertical support 132, as well as a second vertical support 133 located at a distal end of shaft 138 from the first vertical support 132. A pair of platform mounts 140, 142 are fixed to shaft 138 to rotate with shaft 138. The bottom of platform 112 is fixedly attached to platform mounts 140, 142 such that platform 112 pivots as shaft 138 and pivot mounts 140, 142 rotate.

Figure 5:
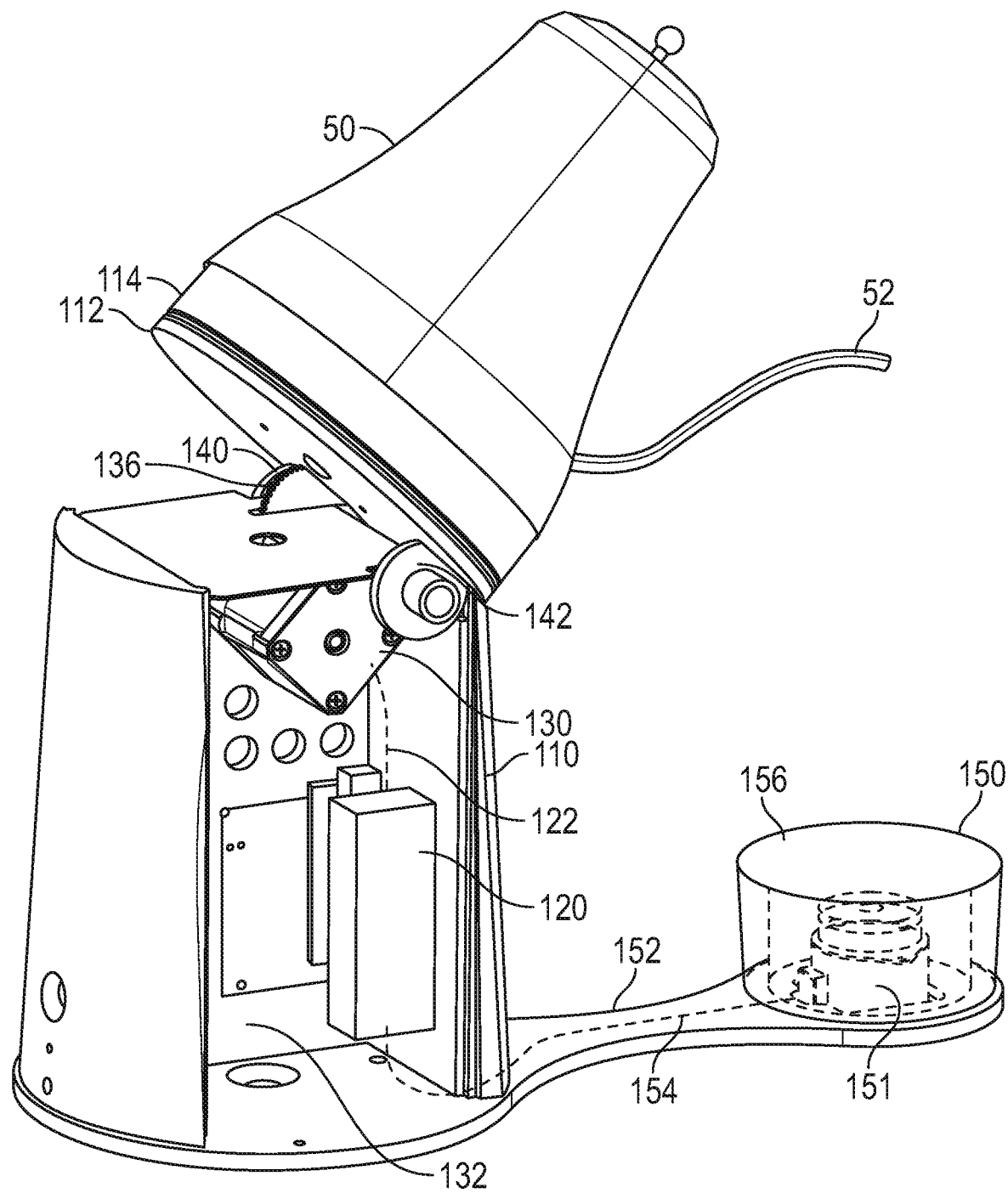
FIG. 5 is a right rear perspective view, partially in section, of the single brew system with kettle of FIG. 1, with the kettle tipped for pouring.

Referring to FIG. 5, mug base 150 includes a second motor 151 that is electrically connected to controller 120 via an electrical connection 154. An output of second motor 151 is fixedly connected to a platform 156 on which a coffee mug (not shown) is set. Platform 156 rotates with the operation of second motor 151 to rotate platform 156 and, consequently, the mug and single serve brewing system.

To operate system 100, a mug and single serve brewing system are placed on top of platform 156 and kettle 50 is placed on top of platform 112. Liquid can be poured into kettle 50 either before or after kettle 50 is placed on top of platform 112. Kettle 50 can be filled to an internal fill line (not shown). Controller 120 is calibrated for the dimensions of kettle 50 meaning that, because different kettles can have different dimensions and different spout sizes/locations, which result in different pour rates, the pouring properties of kettle 50 are determined (such as by trial and error) until satisfactory pours are provided from kettle 50.

Controller 120 is activated, which in turn, activates motors 130, 151. Motor 130 operates to pivot platform 112 to tilt kettle 50 so that fluid from kettle 50 pours out of spout 52 and into the single serve brewing system. Controller 120 controls the operation of pivot platform 112 to tilt over its 0 to 45 degree range, occasionally pivoting platform 112 to the initial rest position (0 degrees) for a predetermined period of time in order to allow fluid that has been poured from kettle 50 to work its way through the grounds in the single serve brew system and into the mug. Further, as the kettle 50 moves between its initial pour point to its full tilt, the location within the single brew system where the fluid lands changes radially such that, at a 45 degree tilt angle, the fluid lands generally in the middle of the single serve brew system, while at other tilt angles, the fluid lands generally between the middle and the edge of the single serve brew system.

Simultaneously, motor 151 operates to rotate mug platform 156 as well as the single serve brewing system. In an exemplary embodiment, mug platform 156 can be rotated about 360 degrees in one direction, stopped, and then rotated about 360 degrees in a reverse direction. This rotation, in combination with the tilting aspects of the platform 112 described immediately above, serves to distribute the fluid over the single brew system to get a fuller brewing experience than by simply pouring the fluid into the same location during the entire pour.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A single brew system comprising:
   a kettle base;
   a platform attached to the kettle base, the platform adapted to receive and retain a kettle;
   a mug base spaced from the kettle base; and
   a mug platform attached to the mug base, the mug platform adapted to receive a mug,
   wherein the platform is pivotally connected to the kettle base.

2. The single brew system according to claim 1, further comprising an arm connecting the kettle base and the mug base.

3. The single brew system according to claim 1, further comprising a motor located in the kettle base and connected to the platform such that, when the motor operates, the platform pivots relative to the kettle base.

4. The single brew system according to claim 3, further comprising a gear operatively connected between the motor and the platform.

5. The single brew system according to claim 1, wherein the mug platform is rotationally connected to the mug base.

6. The single brew system according to claim 5, further comprising a mug motor located in the mug platform such that, when the mug motor operates, the mug platform rotates relative to the mug base.

7. The single brew system according to claim 6, wherein the mug motor is configured to rotate the mug platform about 360 degrees in one direction.

8. The single brew system according to claim 7, wherein the mug motor is configured to rotate the mug platform about 360 degrees in a reverse direction from the one direction.

9. A brew system comprising:
   a kettle base;
   a kettle motor located in the kettle base, the kettle motor having a kettle motor output;
   a kettle platform pivotally connected to the kettle base such that, when the kettle motor operates, the kettle base pivots relative to the kettle base;
   a motor base attached to the kettle base;
   a mug motor located in the mug base, the mug motor having a mug motor output; and
   a mug platform rotationally connected to the mug motor output such that, when the mug motor operates, the mug base rotates relative to the mug base.

10. The brew system according to claim 9, further comprising a controller located in the kettle base, the controller electronically connected to the kettle motor and to the mug motor, such that the controller controls the kettle motor and the mug motor to operate simultaneously.

\* \* \* \* \*